(12) United States Patent
Mayer et al.

(10) Patent No.: US 7,045,573 B2
(45) Date of Patent: May 16, 2006

(54) POLYURETHANE DISPERSION (PUD) WITH IMPROVED ISOPROPANOL RESISTANCE, FLEXIBILITY AND SOFTNESS

(75) Inventors: Eduard Mayer, Dormagen (DE); Thomas Muenzmay, Dormagen (DE); Yuliya Berezkin, Pittsburgh, PA (US); Poli C. Yu, Wexford, PA (US); Richard R. Roesler, Wexford, PA (US); Mary A. Crisci, Aliquippa, PA (US)

(73) Assignees: Bayer MaterialScience LLC, Pittsburgh, PA (US); Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 10/677,882

(22) Filed: Oct. 2, 2003

(65) Prior Publication Data

US 2004/0210026 A1 Oct. 21, 2004

Related U.S. Application Data

(63) Continuation-in-part of application No. 10/419,584, filed on Apr. 21, 2003, now abandoned.

(51) Int. Cl.
*C08G 18/10* (2006.01)

(52) U.S. Cl. .......... 524/840; 528/76; 528/77; 528/61; 2/167; 128/844; 428/36.8

(58) Field of Classification Search .......... 528/76, 528/77, 61; 524/840; 2/167; 128/844; 428/36.8
See application file for complete search history.

(56) References Cited

U.S. PATENT DOCUMENTS

| | | | |
|---|---|---|---|
| 3,839,491 A | 10/1974 | Gamero et al. | 260/77.5 AT |
| 4,895,894 A * | 1/1990 | Ruetman et al. | 524/840 |
| 4,956,438 A | 9/1990 | Ruetman et al. | 528/60 |
| 5,576,382 A | 11/1996 | Seneker et al. | 524/591 |
| 5,821,316 A * | 10/1998 | Quay et al. | 528/64 |
| 5,985,955 A | 11/1999 | Bechara et al. | 523/415 |
| 5,997,969 A | 12/1999 | Gardon | 428/35.7 |
| 6,084,051 A | 7/2000 | Blum et al. | 528/71 |
| 6,389,602 B1 | 5/2002 | Alsaffar | 2/161.7 |
| 6,440,498 B1 | 8/2002 | Schaller | 427/261 |
| 6,451,908 B1 | 9/2002 | Koonce et al. | 524/591 |
| 6,451,963 B1 | 9/2002 | Langel et al. | 528/480 |
| 6,514,572 B1 | 2/2003 | Koonce et al. | 527/458 |
| 2001/0053815 A1 | 12/2001 | Bhattacharjee et al. | 524/839 |
| 2002/0028875 A1 | 3/2002 | Anderle et al. | 524/591 |
| 2002/0028877 A1 | 3/2002 | Parks et al. | 524/839 |

FOREIGN PATENT DOCUMENTS

| | | |
|---|---|---|
| CA | 1089141 | 11/1980 |
| DE | 41 05 908 | 8/1992 |
| EP | 741 152 | 11/1996 |

OTHER PUBLICATIONS

Ulrich; Chemistry and Technology of Isocyanates; 1996; p. 315.*

* cited by examiner

*Primary Examiner*—Rachel Gorr
(74) *Attorney, Agent, or Firm*—Joseph C. Gil; Thomas W. Roy

(57) ABSTRACT

Isocyanate-functional polyurethane prepolymers and aqueous dispersions therefrom which are useful for the production of flat materials having excellent resistance to alcoholic solvents are described. The prepolymers are prepared by reacting:
A) an isocyanate selected from the group consisting of
  i) an aliphatic and/or a cycloaliphatic isocyanate,
  ii) a mixture of an aromatic isocyanate and an aliphatic and/or a cycloaliphatic isocyanate,
B) a di- or polyhydroxy compound having a number average molecular weight of from 700 to about 16,000, and
C) optionally, a dihydroxy and/or polyhydroxyl compound having a number average molecular weight of less than 700, with the provisos that
  a) at least one of components A), B or C) has a functionality of more than 2 and
  b) if both component A) and component B) are difunctional, component C) cannot be a trihydroxy component of the formula:

$$R-(OH)_3$$

where R is a saturated straight chain or branched chain aliphatic group of from 2 to 8 carbon atoms.

15 Claims, No Drawings

POLYURETHANE DISPERSION (PUD) WITH IMPROVED ISOPROPANOL RESISTANCE, FLEXIBILITY AND SOFTNESS

CROSS REFERENCE TO RELATED APPLICATION

This application is a continuation-in-part of U.S. Ser. No. 10/419,584, filed on Apr. 21, 2003 and now abandoned.

BACKGROUND OF THE INVENTION

The invention relates to isocyanate-functional polyurethane prepolymers as well as to aqueous dispersions thereof and the use thereof for the production of flat materials.

In the early 1990's, general prophylactic measures adopted world-wide against HIV, hepatitis B and hepatitis C led to dramatically increased use of latex-based gloves and condoms. Approximately 1% of glove users and approximately 10% of users working in the health field showed allergic sensitization reactions, and this has over recent years considerably increased the importance of the quest for alternative materials in the examination glove and condom sector.

Natural latex contains type I and type IV allergens. Type I allergens are attributable to the proteins which naturally occur in latex, and can even result in anaphylactic shock. Type IV allergens are the accelerators and additives needed in latex production. These frequently lead to hypersensitive contact dermatitis. The allergic reactions described are not known to result from polyurethanes. There is therefore a pressing need for aqueous polyurethane dispersions which can be processed analogously to rubber latex to obtain the aforementioned hygiene articles.

According to the teaching of WO-A 00/61651, aqueous polyurethane dispersions obtained from nonionic isocyanate prepolymers after the addition of anionic emulsifiers and subsequent dispersion with water are suitable for the production of gloves and condoms. A disadvantage of these products, however, is the use of the anionic emulsifiers, which may migrate from the polymers in service, with a consequent negative effect on the service characteristics. The same limitations apply to the products obtainable according to the teaching of WO-A 00/61653.

A major problem when polyurethane gloves are used in medicine and in particular in surgery is the use in these applications of isopropanol-containing mixtures for sterilizing the gloved hands. The utilization of isopropanol brings about swelling of the glove material, which greatly reduces the mechanical resistance of the material, resulting in tearing of the gloves.

U.S. Pat. No. 5,997,969 describes a way of improving the isopropanol resistance of normal commercial polyurethane dispersions by the post-addition of cross-linking components. The addition of a cross-linking component is, however, a technically very demanding and costly process for manufacturers of gloves and condoms, because the mixing devices needed for this purpose are not normally available. Such mixtures of reactive cross-linking agent and substrate have only a limited pot life. This is also a problem for which there can be no ready solution for glove and condom manufacturers, because processing normally follows the coagulation operation, and coagulation batches are not normally used up. They are generally replenished repeatedly with fresh material.

European patent 741,152 discloses NCO-functional polyurethane ("PU") prepolymers based on a polyol component which principally comprises polyoxypropylene diols having low unsaturated unit contents. The dispersions prepared from these are suitable for the production of flexible films and coatings. It is, however, disadvantageous that the PU films have unsatisfactory resistance to solvents.

Canadian patent 1,089,141 describes mixtures of aromatic and aliphatic or cycloaliphatic polyisocyanates for the preparation of finely divided, stable aqueous dispersions of anionically modified polyurethanes. However, the resistance to isopropanol of the flat materials which can be produced from them is likewise deficient.

U.S. application Ser. No. 10/453,755, filed on Jun. 3, 2003 describes several additional references which are directed to the use of polyurethane dispersions for medical applications. The inventions described in the 10/453,755 application are an isocyanate functional prepolymers, aqueous polyurethane dispersions produced from the prepolymers and various medical uses of such dispersions. The prepolymers described therein have an NCO content of from about 1 to about 6% by weight, and are prepared by reacting:

A) an organic diisocyanate,
B) at least one dihydroxy compound having a number average molecular weight of from about 700 to about 16,000, and
C) a trihydroxy component of the formula:

where R is a saturated straight chain or branched chain aliphatic group of from 2 to 8 carbon atoms, and wherein the amount of component C) is such that the hydroxy groups from component C) amount to from about 2 to about 15% based on the total amount of hydroxy equivalents used to produce the prepolymer.

DESCRIPTION OF THE INVENTION

The object of the present invention was to provide NCO-functional prepolymers suitable for the production of polyurethane flat materials which combine satisfactory solvent resistance with simultaneously good minimum tear strength and minimum ultimate elongation, and which do not have the disadvantages described in the prior art.

The present invention provides a polyurethane prepolymer which is prepared from a combination of specific isocyanates and specific hydroxyl group-containing compounds satisfying specified criteria that achieves this objective.

More particularly, the present invention is directed to isocyanate functional prepolymers, aqueous polyurethane dispersions produced from the prepolymers and various uses of such dispersions. The polyurethane prepolymer has an NCO content of from about 1 to about 6% by weight (and preferably from 2 to 4%), and is prepared by reacting:

A) an isocyanate selected from the group consisting of
   i) an aliphatic and/or a cycloaliphatic isocyanate,
   ii) a mixture of an aromatic isocyanate and an aliphatic and/or a cycloaliphatic isocyanate,
B) a di- or polyhydroxy compound having a number average molecular weight of from 700 to about 16,000, and
C) optionally, a dihydroxy and/or polyhydroxyl compound having a number average molecular weight of less than 700, with the provisos that
   a) at least one of components A), B or C) has a functionality of more than 2 and b) if both component A) and component B) are difunctional, component C) cannot be a trihydroxy component of the formula:

where R is a saturated straight chain or branched chain aliphatic group of from 2 to 8 carbon atoms.

Suitable isocyanates include any organic compound which have at least two free isocyanate groups per molecule, such as, for example, diisocyanates $X(NCO)_2$, with X representing a bivalent aliphatic hydrocarbon radical having from 4 to 12 carbon atoms, a bivalent cycloaliphatic hydrocarbon radical having from 6 to 15 carbon atoms, a bivalent aromatic hydrocarbon radical having from 6 to 15 carbon atoms or a bivalent araliphatic hydrocarbon radical having from 7 to 15 carbon atoms. Further examples of compounds which are usable as a diisocyanate component are described, for example, by W. Siefken in Justus Liebig's Annalen der Chemie, 562, pp. 75–136.

Specific examples of useful diisocyanates are tetramethylene diisocyanate, methylpentamethylene diisocyanate, 1,6-hexamethylene diisocyanate, dodecamethylene diisocyanate, 1,4-diisocyanatocyclohexane, 1-isocyanato-3,3,5-trimethyl-5-isocyanatomethyl cyclohexane, 4,4'-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, p-xylylene diisocyanate, p-isopropylidene diisocyanate, 1,3- and 1,4-diisocyanatomethyl benzene, as well as mixtures of these compounds.

1-isocyanato-3,3,5-trimethyl-5-isocyanatomethyl cyclohexane; 1,6-hexamethylene diisocyanate; 4,4'-diisocyanatodicyclohexylmethane; 2,4- and 2,6-diisocyanatotoluene or any mixtures of these isomers; 4,4'-, 2,4'- and 2,2'-diisocyanatodiphenylmethane (MDI monomers) or any mixtures of these isomers, are particularly preferred.

Also useful are the so-called polymeric MDI products such as are obtained by aniline-formaldehyde condensation followed by phosgenation (raw MDI), as well as the polymeric MDI products which are obtainable from these by partial removal of the MDI monomers by distillation.

It is naturally also possible to (co-) use small amounts of the higher-functional polyisocyanates which are known in polyurethane chemistry and modified polyisocyanates having, for example, carbodiimide groups, allophanate groups, isocyanurate groups, urethane groups and/or biuret groups.

In one preferred embodiment, the isocyanate is a mixture which comprise from 5 to 50 wt. %, preferably 10 to 45 wt. %, most preferably 20 to 35 wt. %, of aliphatic and/or cycloaliphatic isocyanate(s) ands from 50 to 95 wt. %, preferably 55 to 90 wt. %, most preferably 65 to 80 wt. %, of aromatic diisocyanate(s).

Suitable components B) are compounds having at least two hydroxyl groups and which have number average molecular weights of from 700 to about 16,000. Examples of such compounds are polyethers, polyesters, polycarbonates, polylactones and polyamides. Preferred compounds have from 2 to 8, most preferably 2 to 4, hydroxyl groups, such as are known for the preparation of homogeneous and cellular polyurethanes and such as are described in, for example, German patent 2,832,253, pages 11 to 18. Mixtures of various such compounds may also be used.

Linear polyester diols or also weakly branched polyester polyols are considered suitable as the polyester polyol(s), which may be prepared in known manner from aliphatic, cycloaliphatic or aromatic dicarboxylic or polycarboxylic acids or anhydrides thereof (for example, succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid) as well as acid anhydrides (such as o-phthalic, trimellitic or succinic acid anhydride or a mixture thereof) with polyhydric alcohols such as, for example, ethanediol, diethylene, triethylene, tetraethylene glycol, 1,2-propanediol, dipropylene, tripropylene, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol or mixtures thereof, optionally with co-use of higher-functional polyols such as trimethylolpropane or glycerol. Cycloaliphatic and/or aromatic dihydroxyl and polyhydroxyl compounds are, of course, also suitable as the polyhydric alcohol(s) for the preparation of the polyester polyol(s). The corresponding polycarboxylic acid anhydrides or corresponding polycarboxylic acid esters of low alcohols, or mixtures thereof, may also be used in place of the free polycarboxylic acid for the preparation of the polyesters.

The polyester polyols may also be homopolymers or copolymers of lactones, which are preferably obtained by addition reactions of lactones or lactone mixtures, such as butyrolactone, ε-caprolactone and/or methyl-ε-caprolactone with the suitable difunctional and/or higher-functional starter molecules such as, for example, the low molecular weight polyhydric alcohols mentioned above as structural components for polyester polyols. The corresponding polymers of ε-caprolactone are preferred.

Polycarbonates having hydroxyl groups are also considered to be suitable polyhydroxyl components. They may be prepared by reaction of diol(s) such as 1,4-butanediol and/or 1,6-hexanediol with diaryl carbonate(s), for example diphenyl carbonate, dialkyl or phosgene.

The polyaddition products of styrene oxides, and of ethylene oxide, propylene oxide, tetrahydrofuran, butylene oxide and epichlorohydrin, as well as co-addition and graft products thereof, as well as polyether polyols obtained by condensation of polyhydric alcohols or mixtures thereof and the polyether polyols obtained by alkoxylation of polyhydric alcohols, amines and aminoalcohols, are examples of suitable polyether polyol(s).

Preferred components B) are the homopolymers, copolymers and graft polymers of propylene oxide and ethylene oxide, which are obtained by addition reactions of the named epoxides with low molecular weight diols or triols, such as have been named above as components for producing polyester polyols, or with higher-functional low molecular weight polyols such as, for example, pentaerythritol or sugar, or with water.

Particularly preferred components B) are polyether polyols based on one or more polyoxypropylene diols having number average molecular weights of about 1000 to about 8000 and having an unsaturated terminal group content of less than or equal to 0.02 milliequivalents, preferably from 0.005 to 0.015 milliequivalents (method used for determination ASTM D2849-69) per gram polyol, which are obtained by known methods by double metal cyanide complex-catalyzed (DMC-catalyzed) polymerization of alkylene oxides, preferably propylene oxides, such as are described, for example, in U.S. Pat. No. 5,158,922 (e.g., Example 30) or European patent 654,302 (p. 5, line 26 to p. 6, line 32). Particularly preferred components B) are the compounds listed in Table 1 below.

TABLE 1

| Polyol | Acclaim® 2200 N | Acclaim® 4200 N | Acclaim® 8200 | Acclaim® 6300 | Acclaim® 3201 |
|---|---|---|---|---|---|
| Physical data | | | | | |
| Molecular weight | 2000 | 4000 | 8000 | 6000 | 3000 |
| Functionality | 2 | 2 | 2 | 3 | 2 |
| Viscosity (20° C.) | 465 | 1225 | 4215 | 1900 | 775 |
| Chemical data | | | | | |
| OH value (mg KOH/g) | 56 | 28 | 14 | 28 | 37 |
| Double bond content (milliequiv./g) | ≦0.0070 | ≦0.0070 | ≦0.0070 | ≦0.0070 | ≦0.0070 |
| Acid value (mg KOH/g) | 0.02 | 0.018 | 0.02 | 0.02 | 0.018 |

All Acclaim® polyol products are commercially available from Bayer AG, Leverkusen, Germany.

In one preferred embodiment of the present invention, component B) comprises at least 60% by weight of at least one polyoxypropylene glycol.

Suitable components C) are di- and/or polyhydroyxl compounds having number average molecular weights of from 62 to less than 700. The polyhydric, in particular dihydric, alcohols named for the preparation of the polyester polyols, as well polyether diols and triols and polyester diols having the required molecular weight. Suitable low molecular polyesters include, e.g., adipic acid-bis-(hydroxyethyl)esters. Also useful are short-chain homo-addition and co-addition products of ethylene oxide or of propylene oxide, started on aromatic diols. Preferred components C) are i) the low molecular weight diols: 1,2-ethanediol, 1,4-butanediol, 1,6-hexanediol and 2,2-dimethyl-1,3-propanediol, with 1,4-butanediol and 1,6-hexanediol being particularly preferred, and ii) low molecular weight polyether triols.

Also useful are addition products of alkylene oxides such as, for example, propylene oxide or ethylene oxide, with aromatic dihydroxy compounds or aromatic dicarboxylic acids such as, for example, hydroquinone, resorcinol, pyrocatechol or 2,2-bis(4-hydroxyphenyl)propane (bisphenol A).

The present invention also provides a process for the preparation of prepolymers according to the invention having isocyanate groups in which the components A), B) and C) are reacted in a ratio such that the isocyanate content is between from 1 to 6 wt. %, and preferably from 2 to 4 wt. %.

Generally, the ratio of the components is such that the mathematical number average isocyanate functionality of the resulting prepolymer(s) is between 2.1 and 3.6, and preferably between 2.3 and 2.8. The preparation takes place within the temperature range 20 to 130° C., preferably between 50 and 120° C., most preferably between 70 and 105° C.

The prepolymer according to the invention may then be converted into an aqueous dispersion. For this purpose, the prepolymer according to the invention is reacted with an amino-functional component D) and an amine chain extender E).

The present invention also provides aqueous polyurethane dispersions which comprise the prepolymers according to the invention as well as D) compounds which comprise an anionic or potentially anionic group and two groups which are reactive to isocyanate groups and E) at least one chain extender having two amine groups which are reactive to isocyanate groups.

Suitable components D) are compounds which include an anionic group or a group enabled to form anionic groups (potentially anionic group) and two groups which are reactive to isocyanate groups, such as, for example, diamino compounds which comprise as the anionic group a carboxylate group or sulfonate group or as the potentially anionic group a carboxylic acid group or sulfonic acid group. Preferred components D) are diamines or polyamines which comprise alkali metal sulfonate groups, such as, for example, the alkali metal salts of N-(2-aminoethyl)-2-aminoethanesulfonic acid. The sodium salt is particularly preferred.

The free carboxylic acids or sulfonic acids may naturally also be incorporated in the isocyanate polyaddition process. These must then be neutralized with neutralizing agents such as, for example, alkali metal hydroxides, alkali metal hydrogen carbonates, alkali metal carbonates or tertiary amines such as, for example, triethylamine, diisopropyl ethylamine, triisopropylamine, N,N-dimethyl ethanolamine, triethanolamine or triisopropanolamine before conversion of the polyurethane resin(s) in water.

Compounds suitable as the chain extender E) are aliphatic and/or alicyclic primary and/or secondary diamines such as, for example, 1,2-ethanediamine, 1,6-hexamethylenediamine, 1-amino-3,3,5-trimethyl-5-aminomethyl cyclohexane (isophorone diamine), piperazine, 1,4-diaminocyclohexane, bis(4-aminocyclohexyl)methane, adipic acid dihydrazide or hydrazine. Polyether diamines, which may be prepared by reaction of the corresponding polyether diols with ammonia and/or primary amines, are also useful. However, 1-amino-3,3,5-trimethyl-5-aminomethyl cyclohexane (isophorone diamine) and 1,2-ethanediamine are particularly preferred as the chain extenders E).

The aqueous preparations of polyurethane resins, on which the dispersions according to the invention are based may generally be prepared by a process which is described by D. Dieterich in Houben-Weyl: Methoden der Organischen Chemie, Vol. E20, pp 1670–1681 (1987). The so-called "acetone process" is preferred. In this process the aqueous preparations on which the dispersions are based, which comprise the prepolymers according to the invention, are synthesized in a multi-stage process.

In the first stage, the prepolymer according to the invention is dissolved in an organic, at least partially water-miscible solvent having no isocyanate-reactive groups. The preferred solvent is acetone. However, other solvents such as, for example, 2-butanone, tetrahydrofuran, dioxane, N-methylformamide, N-methylacetamide or N-methylpyrrolidone may also be used, either as such or included in small amounts. The quantities are generally such that a solids content of from 20 to 80 wt. %, preferably 30 to 50 wt. %, results.

The prepolymer solution is then reacted with mixture(s) of the amino-functional component(s) D) and the component E), preferably dissolved in one of the aforementioned solvents or in water, with chain lengthening, to obtain the high molecular weight polyurethane resin. The quantities of the components are such that from 0.3 to 0.93, preferably from 0.65 to 0.85 mole of $NH_2$ groups of the components D) and E) are present per mole of isocyanate groups of the dissolved prepolymer. The component D) which contains an anionic group or a group enabled to form anionic groups should, moreover, be used in quantities such that from 19 to 70 meq. of ions per 100 g solids, preferably from 20 to 35 meq. of ions per 100 g solids, are in the resulting polyurethane.

When components D) having a free carboxylic acid group or sulfonic acid group are used, the acid groups are neutralized with a neutralizing agent before the addition of the water necessary for dispersing, at a ratio of from 50 to 100 equivalent %, in relation to free acid groups.

The high molecular weight polyurethane resin is precipitated in the form of a finely divided dispersion by the addition of water to the solution. The organic solvent may optionally be distilled off in whole or in part at reduced pressure. The quantity of water is such that the resultant aqueous dispersions comprise from 30 to 60 wt. %, preferably 35 to 50 wt. %, solids.

The aqueous dispersions of the invention have an average particle diameter (measured by laser correlation spectroscopy) of from 50 to 300 nm, preferably 60 to 150 nm, and are stable in storage for at least 6 months.

The dispersions of the invention may be processed by conventional processes to obtain films, foils, surface coatings, coatings, finishes and for impregnation of the most widely varied substrates. The dispersions are preferably suitable for the production of films, most preferably for the manufacture of polyurethane gloves and condoms by the dip process or coagulation process.

The invention provides polyurethane films which are resistant to isopropanol. The use of the prepolymers according to the invention is preferred for the manufacture of polyurethane gloves and condoms.

The polyurethane dispersions of the invention may also, depending on their intended use, contain conventional auxiliary agents and additives, such as, for example, crosslinking agents, plasticizers, pigments, defoaming agents, soft-feel additives or fillers.

It is likewise possible to combine the aqueous dispersions of the invention, with other dispersions such as, for example, polyacrylate dispersions, natural and synthetic rubber latices such as, for example, NBR (nitrile-butadiene rubber), chloroprene or other homopolymers and copolymers such as, for example, ethyl vinyl acetate or ethyl vinyl alcohol.

The flat materials produced from the polyurethane dispersions of the present invention have satisfactory solvent resistance while at the same time have good minimum tear strength and minimum ultimate elongation.

The invention is further illustrated but is not intended to be limited by the following examples in which all parts and percentages are by weight, unless otherwise specified.

EXAMPLES

Examples 1 through 5

General Directions for the Production of the Polyurethane Dispersion Films

The aqueous dispersions are applied to a glass plate by means of a 1000 μm doctor knife, and should be blister-free and foam-free. The coatings are pre-dried at room temperature for from 16 to 24 hours. The clear films are then post-dried in a circulating-air drying cabinet at 80° C. for 1 hour. The films are then left at room temperature for at least 5 hours. After the removal of the films from the glass plate, the test specimens which are in each case required are punched from the films.

Determination of the Alcohol Resistance of Polyurethane Dispersion Films

Dimensions of test specimens, in mm

| | |
|---|---|
| Total length: | 75.0 |
| Width of head: | 12.5 |
| Length of web: | 25.0 |
| Width of web: | 4.0 |
| Thickness: | approx. 0.2 |

The test specimens were stored at room temperature for 24 hours. They were then marked at the left and the right of the web at a distance of approx. 50 mm and then elongated to 100% and clamped in this state. The test specimen under tension was wetted in the center of the two marks with 2 drops of isopropanol. If the sample was destroyed, it had no alcohol resistance Particle size was determined by laser correlation spectroscopy (measuring instrument: Malvern Instruments Zetasizer 1000).

Example 1

(Comparison Example) Corresponds to Example 1 Canadian Patent 1,089,141

203 g of a polyester prepared from adipic acid, hexanediol and neopentyl glycol, having an OH value of 55 mg KOH/g were dewatered at from 110 to 120° C. and at 30 mbar for 30 minutes. The polyester was cooled and dissolved in 200 g acetone, and 40.5 g 1,4-butanediol were added. A mixture of 69.7 g toluene diisocyanate (isomer ratio 2,4/2,6=80/20) and 69.7 g hexamethylene diisocyanate, as well as 0.02 g dibutyltin dilaurate was then added. After stirring at 60° C. for 3 hours, the batch was diluted with 300 g acetone and cooled to room temperature. 19.3 g of a 40% aqueous solution of the equimolar addition product of ethylenediamine and sodium acrylate were stirred into the solution of the prepolymer thus obtained. After 20 minutes, 500 g water were added dropwise, and the acetone was then distilled off at reduced pressure. A very finely divided, stable dispersion resulted.

The PU flat materials produced from this dispersion tore when treated with isopropanol, consequently demonstrating no alcohol resistance.

Ion content [meq./100 g]=14.3

Components Used:

Acclaim® 2200N, 4200N, 6300 and PPG 1000 polyols as well as Desmophen® V 218 polyol which are commercially available from Bayer AG, Leverkusen, Germany.

TABLE 2

| 1. Polyol components | | | |
|---|---|---|---|
| Polyol | OH value (mg KOH/g) | Double bond content (meq./g) | Starter |
| Acclaim ® 2200N | 56 | <0.0070 | 1,2-propylene glycol |
| Acclaim ® 4200N | 28 | <0.0070 | 1,2-propylene glycol |
| Acclaim ® 6300 | 28 | <0.0070 | glycerol |
| Acclaim ® PPG 1000 | 112 | approx. 0 | 1,2-propylene glycol |
| Desmophen ® V 218 | 245 | approx. 0 | glycerol |

2. Isocyanate Components:
Toluene diisocyanate, TDI 80: Isomer ratio 2,4/2,6=80/20, NCO functionality=2
1-isocyanate-5-(isocyanatomethyl)-1,3,3-trimethylcyclohexane: IPDI, isophorone diisocyanate
Other Components:
AAA salt: sodium salt of N-2-aminoethane-2-aminosulfonic acid, 45% in water
1,4-butanediol
ethylenediamine
water Example 2

According to the Invention

| 446.4 g | Acclaim ® 2200N polyol |
| 167.0 g | Acclaim ® 6300 polyol |
| 26.1 g | 1,4-butanediol |
| 39.4 g | 1-isocyanate-5-(isocyanatomethyl)-1,3,3-trimethylcyclohexane (IPDI) |
| 115.6 g | toluene diisocyanate (TDI 80) |
| 1770.0 g | acetone |
| 75.6 g | AAA salt |
| 0.4 g | ethylenediamine |
| 1640.0 g | partially deionized water |

A mixture of 446.4 g Acclaim® 2200 N polyol and 167.0 g Acclaim® 6300 polyol was dewatered at from 110 to 120° C. and from 30 to 50 mbar for 1 hour. The mixture was then cooled to 90° C. and stirred with 26.1 g 1,4-butanediol for 5 minutes, and 39.4 g IPDI and 115.6 g TDI 80 were then added to it. After stirring at from 95 to 105° C. for 7 hours, an isocyanate-terminated prepolymer having an isocyanate (NCO) content of 3.04% (theoretical NCO=3.04%) was obtained. The prepolymer was cooled to approx. 60° C., and 1770 g acetone were added, with stirring. An amine chain extender solution prepared from 75.6 g AAA salt and 0.4 g ethylenediamine in 113 g water was added at approx. 50° C. to the clear, homogeneous prepolymer solution. The solution thereby became turbid and the viscosity increased slightly. After 15 minutes, 1640 g partially deionized water were allowed to run in within 30 seconds, with rapid stirring. After about 200 ml water, a low-viscosity dispersion formed. Acetone was then distilled off under a water jet-induced vacuum at 50° C.

A stable, finely divided dispersion having an average particle size of 84 nm resulted. The dispersion had a solids content of 33.6% and a Ford viscosity cup value (4 mm nozzle) of 18 seconds at 25° C.

Films were drawn from the dispersions on a glass plate by means of a doctor knife. These films were dried first at room temperature and then in a circulating-air drying cabinet for 1 hour at 80° C.

The resulting films were clear and elastic and were resistant to isopropanol.

Ion content [meq./100 g]=21.6.

Example 3

According to the Invention

| 216.2 g | Acclaim ® 2200N polyol |
| 445.4 g | PPG 1000 |
| 23.5 g | Desmophen ® V 218 polyol |
| 43.5 g | 1-isocyanate-5-(isocyanatomethyl)-1,3,3-trimethylcyclohexane (IPDI) |
| 125.4 g | toluene diisocyanate (TDI 80) |
| 1653.0 g | acetone |
| 76.1 g | AAA salt |
| 0.3 g | ethylenediamine |
| 1826.0 g | partially deionized water |

A mixture of 216.2 g Acclaim® 2200 N polyol, 445.4 g PPG 1000 and 23.5 g Desmophen® V 218 polyol was dewatered at from 110 to 120° C. and from 30 to 50 mbar for 1 hour. The mixture was then cooled to 90° C. and 43.5 g IPDI and 125.4 g TDI 80 were then added to it. After stirring at from 95 to 105° C. for approx. 7 hours, an isocyanate-terminated prepolymer having an isocyanate (NCO) content of 2.89% (theoretical NCO=3.08%) was obtained. The prepolymer was cooled to approx. 60° C., and 1653 g acetone were added, with stirring. An amine chain extender solution prepared from 76.1 g AAA salt and 0.3 g ethylenediamine in 114 g water was added at approx. 50° C. to the clear, homogeneous prepolymer solution. The solution thereby became turbid and the viscosity increased slightly. After 15 minutes, 1826 g partially deionized water were allowed to run in within 30 seconds, with rapid stirring. After about 200 ml water, a low-viscosity dispersion formed. Acetone was then distilled off under a water jet-induced vacuum at 50° C.

A stable, finely divided dispersion having an average particle size of 65 nm resulted. The dispersion had a solids content of 33.8% and a Ford viscosity cup value (4 mm nozzle) of 48 seconds at 25° C.

The films produced with this dispersion were drawn on a glass plate by means of a doctor knife. These films were dried first at room temperature and then in a circulating-air drying cabinet for 1 hour at 80° C.

The films were clear and elastic and were resistant to isopropanol.

Ion content [meq./100 g]=20.3.

Example 4

According to the Invention

| | |
|---|---|
| 544.1 g | Acclaim ® 2200N polyol |
| 176.0 g | Acclaim ® 6300 polyol |
| 29.2 g | 1-isocyanate-5-(isocyanatomethyl)-1,3,3-trimethylcyclohexane (IPDI) |
| 84.9 g | toluene diisocyanate (TDI 80) |
| 1619.0 g | acetone |
| 75.1 g | AAA salt |
| 0.8 g | ethylenediamine |
| 1787.0 g | partially deionized water |

A mixture of 544.1 g Acclaim® 2200 N and 176.0 g Acclaim® 6300 polyols was dewatered at from 110 to 120° C. and from 30 to 50 mbar for 1 hour. The mixture was then cooled to 90° C. and 29.2 g IPDI and 84.9 g TDI 80 were then added to it. After stirring at from 95 to 105° C. for approx. 7 hours, an isocyanate-terminated prepolymer having an isocyanate (NCO) content of 2.90% (theoretical NCO=3.06%) was obtained. The prepolymer was cooled to approx. 60° C., and 1619 g acetone were added, with stirring. An amine chain extender solution prepared from 75.1 g AAA salt and 0.8 g ethylenediamine in 113 g water was added at approx. 50° C. to the clear, homogeneous prepolymer solution. The solution thereby became turbid and the viscosity increased slightly. After 15 minutes, 1787 g partially deionized water were allowed to run in within 30 seconds, with rapid stirring. After about 200 ml water, a low-viscosity dispersion formed. Acetone was then distilled off under a water jet-induced vacuum at 50° C.

A stable, finely divided dispersion having an average particle size of 108 nm resulted. The dispersion had a solids content of 34.0% and a Ford viscosity cup value (4 mm nozzle) of 30 seconds at 25° C.

The films of the dispersion were drawn on a glass plate by means of a doctor knife and were then dried first at room temperature and then in a circulating-air drying cabinet for 1 hour at 80° C.

The resulting films were clear and elastic and proved to be resistant to isopropanol.

Ion content [meq./100 g]=20.5.

Example 5

Comparison Example Corresponds to Example 3 of European Patent 741,152

| | |
|---|---|
| 400.0 g | Acclaim ® 4200N polyol |
| 20.3 g | dimethylolpropionic acid |
| 122.5 g | 1-isocyanate-5-(isocyanatomethyl)-1,3,3-trimethylcyclohexane |
| 12.3 g | triethylamine |
| 13.2 g | ethylenediamine |
| 70.0 g | fully deionized water |
| 780.0 g | fully deionized water |

400.0 g Acclaim® 4200 N polyol were dewatered at from 110 to 120° C. and from 30 to 50 mbar for 1 hour. 20.3 g Dimethylolpropionic acid were then added and the mixture was stirred at 100° C. for 30 minutes. It was then cooled to 90° C. and 122.5 g 1-isocyanate-5-(isocyanatomethyl)-1,3,3-trimethylcyclohexane were added to it. The reaction was continued at 100° C. until a constant isocyanate content was obtained (theoretical value=4.21% isocyanate). After cooling to 65° C., 12.3 g triethylamine were added and stirred for a further 15 minutes. The prepolymer was poured into 780 g fully deionized water kept constant at 50° C., while stirring well. After complete dispersion, the chain length was increased by the addition of 13.3 g ethylenediamine in 70 g fully deionized water. Stirring was continued at 50° C. until the dispersion was isocyanate-free. A moderately finely divided stable dispersion was obtained.

TABLE 3

Mechanical properties and isopropanol resistance

| Example | 100% modulus [MPa] | Tensile strength [MPa] | Ultimate elongation [%] | Isopropanol resistance |
|---|---|---|---|---|
| 1 (Comparison) | 1.1 | 5.9 | 850 | no |
| 2 | 1.4 | 16.4 | 1310 | resistant |
| 3 | 1.7 | 13.1 | 1100 | resistant |
| 4 | 1.4 | 11.6 | 1620 | resistant |
| 5 (Comparison) | 5.9 | 33.4 | 900 | no |

Example 6

According to the Invention

The following materials were charged to a reactor equipped with heating mantle, stirrer, nitrogen inlet, reflux condenser and charging funnel: 376.98 grams of a polyesterdiol (OH number of 66, prepared from adipic acid, hexane diol and neopentyl glycol) and 10.07 grams of a polyether triol (a trimethylol propane/propylene oxide polyether having an OH number of 380 and a number average molecular weight of 440). The stirrer was then turned on and the mixture was heated to 58° C. At that temperature 73.81 grams of hexamethylene diisocyanate were added. The reaction mixture was allowed to exotherm to 75° C. and was then held at 80° C. until the isocyanate content reached 3.17% by weight (theory=3.36%). The mixture was diluted with 691.28 g acetone and cooled to 42.5° C. A solution of 3.59 grams of ethylenediamine and 20.81 grams of the sodium salt of N-2-aminoethane-2-aminosulfonic acid in 107 grams of distilled water were added within five minutes. Five minutes later 600 grams of distilled water were added under high agitation (650 RPM) and the acetone was subsequently distilled off under reduced pressure. A fine dispersion having a particle size of about 231 nm and a solids content of 44% by weight was obtained.

Example 7

According to the Invention

The following materials were charged to a, reactor equipped with heating mantle, stirrer, nitrogen inlet, reflux condenser and charging funnel: 252.96 grams of a polyesterdiol (OH number of 66, prepared from adipic acid, hexane diol and neopentyl glycol) and 44.56 grams of propylene oxide based polyether triol (Acclaim 3300—OH number 57 and number average molecular weight of 3000). The stirrer was then turned on and the mixture was heated to 75° C. At that temperature 49.53 grams of hexamethylene diisocyanate were added. The reaction mixture was allowed to exotherm to 80° C. and was then held at 72° C. until the isocyanate content reached 2.68% by weight (theory=2.99%). The mixture was diluted with 520.57 grams of acetone and cooled to 44.5° C. A solution of 2.29 grams of ethylene-diamine and 15.14 grams of the sodium salt of N-2-aminoethane-2-aminosulfonic acid in 100 grams of distilled water were added within five minutes. Ten minutes later, 557 grams of distilled water were added and the acetone was distilled off under reduced pressure. A fine dispersion having a particle size of the dispersed phase of about 185 nm and a solids content of 36% by weight was obtained.

Example 8

Comparative Example—No Higher Functional Material

The following materials were charged to a reactor equipped with heating mantle, stirrer, nitrogen inlet, reflux condenser and charging funnel: 1133.0 grams of a polyesterdiol (OH number of 66, prepared from adipic acid, hexane diol and neopentyl glycol). The stirrer was then turned on and the mixture was heated to 70° C. At that temperature, 201 grams of hexamethylene diisocyanate were added. The reaction mixture was allowed to exotherm to 85° C. and was then held at 85° C. until the isocyanate content reached 2.84% by weight (theory=3.32%). The mixture was diluted with 2405 grams of acetone and cooled to 47° C. A solution of 11.5 grams of ethylene-diamine, and 53.3 grams of the sodium salt of N-2-aminoethane-2-aminosulfonic acid in 300 grams of distilled water were added within 30 seconds. Fifteen minutes later, 1800 grams of distilled water were added and the acetone was distilled off under reduced pressure. A fine particle dispersion having a particle size of the dispersed phase of about 87 nm and a solids content of 40% by weight was obtained.

Example 9

Comparative Example—Branching by Triamine

The following materials were charged to a reactor equipped with heating mantle, stirrer, nitrogen inlet, reflux condenser and charging funnel: 380.0 grams of a polyesterdiol (OH number of 66, prepared from adipic acid, hexane diol and neopentyl glycol). The stirrer was then turned on and the mixture was heated to 70° C. At that temperature 67.2 grams of hexamethylene diisocyanate were added. The reaction mixture was allowed to exotherm to 70 to 75° C. and was then held at 75° C. till the isocyanate content reached 2.98% by weight (theory=3.32%). The mixture was diluted with 795 grams of acetone and cooled to 41.5° C. A solution of 3.49 grams of ethylenediamine, 0.38 grams of diethylenetriamine and 8.05 grams of the sodium salt of N-2-aminoethane-2-aminosulfonic acid in 100 grams of distilled water were added within 30 seconds. 15 minutes later, 610 grams of distilled water were added and the acetone was distilled off under reduced pressure. A fine particle dispersion having a solids content of 41% was obtained.

Preparation of Films from Dispersions of Examples 6 through 9

A coagulant solution consisted of a mixture of calcium carbonate and calcium nitrate. The coagulant solution was heated to 60° C. and continuously stirred. A porcelain tube was preheated to 65.6° C. The tube was dipped into the coagulant solution and withdrawn slowly. The tube was rotated to evenly distribute the coagulant. The tube was allowed to air dry for 60 seconds. The tube was then dipped into the polyurethane dispersion and withdrawn slowly. The tube was rotated to evenly distribute the dispersion. The coating was allowed to air dry for 60 seconds. The coated tube was dipped into a container of 48.9° C. water for 2 minutes. The tube was placed in a 148.9° C. oven for 8 minutes. The cured film was dusted with corn starch and removed from the tube by rolling the film down. A flat film was obtained by cutting the polyurethane tube down one side. Each film was then tested for isopropanol resistance using a Sterillium solution (a commercially available disinfectant/isopropanol solution).

A dumbbell shaped specimen was cut from the polyurethane film prepared as above. The ends of the dumbbell were stretched so that the center portion of the film was lengthened 100% (i.e., a one inch portion was stretched to two inches). One drop of Sterillium® solution was deposited on the middle of the stretched section of the film. The amount of swelling or the breaking of the film was recorded.

The films from the dispersions of Examples 6 and 7 did not swell, while the films from the dispersions of Examples 8 and 9 broke.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane dispersion comprising
A) a polyurethane prepolymer having an NCO content of from about 2 to about 4 by weight, prepared by reacting:
   a) an isocyanate selected from the group consisting of
      i) an aliphatic and/or a cycloaliphatic isocyanate,
      ii) a mixture of an aromatic isocyanate and an aliphatic and/or a cycloaliphatic isocyanate,
   b) a di- or polyhydroxy compound having a number average molecular weight of from 700 to about 16,000, and
   c) optionally, a dihydroxy and/or polyhydroxyl compound having a number average molecular weight of less than 700, with the provisos that
      1) at least one of components a), b) or c) has a functionality of more than 2 and
      2) if both component a) and component b) are difunctional, component c) cannot be a trihydroxy component of the formula:

R—(OH)$_3$ where R is a saturated straight chain or branched chain aliphatic group of from 2 to 8 carbon atoms
B) a compound having an anionic or potentially anionic group and two groups which are reactive to isocyanate groups, and
C) a chain extender having two amine groups which are reactive with isocyanate groups,
   wherein said component B) is a diamine or polyamine which contains alkali metal sulfonate groups.

2. The dispersion of claim 1, wherein said component B) is an alkali metal salt of N-(2-aminoethyl)-2-aminoethane sulfonic acid.

3. The dispersion of claim 1, wherein said components B) and C) are used as a mixture.

4. An aqueous polyurethane dispersion comprising
A) a polyurethane prepolymer having an NCO content of from about 1 to about 6% by weight, prepared by reacting:
   a) an isocyanate mixture comprising: (1) from 5 to 50% by weight of an aliphatic and/or cycloaliphatic isocyanate and (2) from 50 to 95% by weight of an aromatic diisocyanate.
   b) a di- or polyhydroxy compound having a number average molecular weight of from 700 to about 16,000, and
   c) optionally, a dihydroxy and/or polyhydroxyl compound having a number average molecular weight of less than 700, with the provisos that
      1) at least one of components a), b) or c) has a functionality of more than 2 and
      21 if both component a) and component b) are dilunctional, component c) cannot be a trihydroxy component of the formula:

R—(OH)$_3$ where R is a saturated straight chain or branched chain aliphatic group of from 2 to 8 carbon atoms.
B) a compound having an anionic or potentially anionic group and two groups which are reactive to isocyanate groups, and
C) a chain extender having two amine groups which are reactive with isocyanate groups.

5. The dispersion of claim 3, wherein component b) is a polyether polyol based on at least one polyoxypropylene diol having a number average molecular weight of from about 1000 to about 8000 and having an unsaturated terminal group content of less than or equal to 0.02 milliequivalents per gram polyol.

6. An aqueous polyurethane dispersion comprising
A) a polyurethane prepolymer having an NCO content of from about 1 to about 6% by weight, prepared by reacting:
   a) an isocyanate selected from the group consisting of
      i) an aliphatic and/or a cycloaliphatic isocyanate,
      ii) a mixture of an aromatic isocyanate and an aliphatic and/or a cycloaliphatic isocyanate,
   b) a polyether polyol based on at least one polyoxypropylene diol having a number average molecular weight of from about 1000 to about 8000 dalton and having an unsaturated terminal group content of less than or equal to 0.02 milliequivalents per gram polyol, and
   c) optionally, a dihydroxy and/or polyhydroxyl compound having a number average molecular weight of less than 700, with the provisos that
      1) at least one of components a), b) or c) has a functionality of more than 2 and
      2) if both component a) and component b) are difunctional, component C) cannot be a trihydroxy component of the formula:

R—(OH)$_3$ where R is a saturated straight chain or branched chain aliphatic group of from 2 to 8 carbon atoms.
B) a compound having an anionic or potentially anionic group and two groups which are reactive to isocyanate groups, and
C) a chain extender having two amine groups which are reactive with isocyanate groups.

7. A polyurethane film produced from the dispersion of claim 1.

8. A polyurethane film which is resistant to isopropanol produced from the dispersion of claim 1.

9. A polyurethane glove or condom produced from the dispersion of claim 1.

10. A polyurethane film produced from the dispersion of claim 4.

11. A polyurethane film which is resistant to isopropanol produced from the dispersion of claim 4.

12. A polyurethane glove or condom produced from the dispersion of claim 4.

13. A polyurethane film produced from the dispersion of claim 6.

14. A polyurethane film which is resistant to isopropanol produced from the dispersion of claim 6.

15. A polyurethane glove or condom produced from the dispersion of claim 6.

* * * * *